Patented Feb. 8, 1949

2,460,822

UNITED STATES PATENT OFFICE 2,460,822

ACYLATING FURAN

Howard D. Hartough, Pitman, N. J., and Alvin I. Kosak, Columbus, Ohio, assignors to Socony-Vacuum Oil Company, Incorporated, a corporation of New York No Drawing. Application January 18, 1946, Serial No. 642,112

17 Claims. (Cl. 260—345)

This invention relates to a process for the acylation of furans and, more particularly, is directed to a catalytic method for acylating furan and its derivatives in the presence of a small amount of iodine.

Acylation reactions are well known in the art and connote the union between acyl radicals and molecules of organic compounds under conditions of temperature, pressure and time ordinarily referred to in the art as acylating conditions. The compounds thus produced represent structurally the substitution of the original acyl radical for a hydrogen atom on the organic compound molecule.

As a general rule, the temperature, pressure and time of reaction employed in acylation operations depend upon whether the acylation is effected in the absence or presence of catalysts. The two methods are generally referred to as thermal and catalytic acylation, respectively. The majority of acylation processes fall under the latter category and it is a catalytic acylation process with which the present invention is concerned.

Acyl radicals may be furnished in acylation reactions by various materials commonly referred to as acylating agents. Thus, the anhydrides of carboxylic acids, and acyl halides have served as sources of the acyl radical. In particular, acetic anhydride and acetyl chloride have found wide application as acylating agents.

The acylation of furan and furan derivatives has previously been carried out employing one of the above-mentioned acylating agents in the presence of various catalysts including stannic chloride, ferric chloride, aluminum chloride and titanium tetrachloride.

These catalysts, although applicable with considerable success in the acylation of aromatic hydrocarbons, are only moderately successful where furan is involved. It has been postulated that this may be accounted for by the fact that compounds such as aluminum chloride form addition complexes with the carbonyl group of the resulting ketone substantially decreasing the yield of desired product and requiring a considerable excess of aluminum chloride over the theoretical amount required for the acylation reaction. Thus, when aluminum chloride is used as the condensing agent, the ratio of catalyst to acyl chloride is at least one and, in the case of acid anhydrides, at least two. Likewise, other catalysts of the Friedel-Crafts type must be used in molecular quantities with respect to the acyl halide being employed in the acylation of furan. This is probably due to the fact that acyl halides form comparatively stable molecular complexes with aluminum chloride and the other above-mentioned catalysts, thereby decreasing their catalytic effect.

While yields as high as 50 per cent of theory have been reported, using an aluminum chloride catalyst, these figures have been the exception rather than the rule. In general, the yields of acyl furans heretofore obtained have averaged about 35 per cent of theory. These relatively small yields were believed to be due, at least in part, to the relatively large quantities of catalyst being employed; that is, amounts of the order of molecular quantities with respect to reactants being used. Attempts were, accordingly, made to overcome the existing difficulties by the use of traces or catalytic amounts of aluminum chloride. Minute amounts of this compound, however, failed to catalytically produce any of the desired furyl ketone.

It has now been discovered that iodine and, in general, compounds or materials forming iodine under the acylation conditions, said compounds or materials hereinafter being referred to as iodine formers, catalyze the acylation of furan. It has been found that, by using an iodine catalyst, the above-mentioned difficulties have largely been overcome. It would appear that the advantages obtained using an iodine catalyst can be attributed to the fact that relatively small quantities of iodine or iodine former can be used as effective catalysts in the acylation of furan. By employing an iodine catalyst in relatively small quantities, the formation of addition complexes formerly encountered in the catalytic acylation of furan have been substantially eliminated, the products resulting being almost entirely acyl furans having one or more side chains corresponding to that of the acylating agent. It has been found, in accordance with this invention, that iodine employed in relatively small amounts in comparison to the quantity of furan or acylating agent used effects the acylation of furan smoothly and specifically in contrast to the more conventional acylation catalysts heretofore employed.

It is, accordingly, an object of the present invention to provide an efficient process for synthesizing acylated furans. Another object is to provide a process for catalytically acylating furan and its derivatives. A still further object is to afford a process for catalytically acylating furan in a direct manner which can be easily carried out using a relatively inexpensive catalyst in small amounts. A very important object is to provide a process capable of reacting furan or its derivatives with an acylating agent in the presence of an efficient catalyst to give a yield of acylated furan substantially greater than that heretofore obtained.

These and other objects which will be recognized by those skilled in the art are obtained in accordance with the present invention, wherein furan or its derivatives are acylated by reaction with organic carboxylic acid anhydrides or acyl halides in the presence of a small amount of iodine or iodine former.

Aside from iodine itself, the most effective compound found for forming iodine under the acylation conditions, that is, as iodine former, was hydriodic acid. This material may be used as a relatively dilute solution or as a saturated solution containing approximately 90 per cent hydrogen iodide. A particularly convenient hydriodic acid solution, however, for the purposes of the present invention was found to be the acid of maximum boiling point containing approximately 55-58 per cent of hydrogen iodide. The aqueous solution of hydriodic acid when freshly prepared is colorless but rapidly becomes brown when exposed to air owing to the formation of iodine which dissolves in the acid. It is this property of hydriodic acid which renders it an effective catalyst for the acylation of furan in accordance with the process of this invention. Iodine formation is thus believed to be accounted for by the following equation:

$$4HI + O_2 = 2H_2O + 2I_2.$$

Other iodine formers contemplated for use in the present invention include iodine dioxide which decomposes on heating under acylation conditions to yield iodine as denoted by the equation: $5I_2O_4 = 4I_2O_5 + I_2$. Likewise, other iodine containing compounds may be employed such as certain iodates or oxygen-containing acids of iodine which, in the presence of reducing agents, yield iodine under the acylation conditions. However, for all practical purposes iodine itself is to be preferred as the catalyst for acylating furan in accordance with the present process. Iodine may be introduced as the acylation catalyst in the form of vapor, solution or solid. The latter form is most conveniently handled and accordingly is to be preferred. While the present invention is not to be strictly limited to any specific small amount of catalyst, the quantity of iodine or iodine former used herein will ordinarily be such that the amount of iodine present in the reaction mixture will vary between about 0.03 and about 3.0 per cent by weight of the reactants.

The acylating agents to be used herein may be an organic carboxylic acid anhydride or an acyl halide. Included in the former category are compounds, such as the ketenes, having the basic structural formula

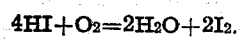

and which, upon addition of water, yield organic carboxylic acids. These acylating agents may be derived by methods well known to the art from mono or dibasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearyl chloride, etc.; the anhydrides of dibasic acids, such as phthalic anhydride; the acyl halides of dibasic acids, such as phthalyl chloride; the anhydrides of unsaturated acids, such as crotonic anhydride and the acyl halides of unsaturated acids, such as crotonyl chloride. These acylating agents are given merely by way of examples and are not to be construed as limiting, since other acyl halides or anhydrides of carboxylic acids which will readily suggest themselves to those skilled in the art may likewise be used.

In addition to furan itself, derivatives of furan having one or more substituent groups, such as halogen, alkyl, aryl, or alkoxy groups attached to the furan ring may likewise be acylated in accordance with this invention. Other furan derivatives, including those having substituents of a highly negative character, such as carbonyl, ester, nitro and cyano groups may likewise be acylated in the presence of small amounts of iodine.

The acylation of furan may be carried out employing equimolar quantities of furan and acylating agent. However, the presence of an excess of one of these reactants has, in general, been found to give an increased yield of the desired product. Thus, an excess of either acylating agent or furan gave an increased amount of ketone as compared with those reactions in which equimolar quantities were used.

The temperature at which the reaction is carried out may vary over a wide extent, the upper limit being dependent on the boiling point of the reactants at the specific pressure of the reaction. Temperatures varying between about −30 and about 150° C. have been found satisfactory for effecting the acylation. However, generally it is more preferable to employ temperatures in the lower range of from about 0° C. to about 50° C. Pressures between about 1 and about 10 atmospheres have been found satisfactory in the acylation process. The effect of increased pressure, theoretically, is toward increased reaction but, from a practical standpoint, this is not a very great effect with reactions such as involved herein which go readily at normal pressures. The temperature to be employed will depend on the time of reaction and the nature of acylating agent used. A materially longer reaction period is to be avoided, since there is a tendency for decomposition to occur, especially when hydriodic acid is employed as the iodine former.

It is preferable to employ a quantity of iodine catalyst between about 0.05 and about 0.7 per cent by weight of the reactants. Amounts of iodine smaller than about 0.03 per cent by weight of the reactants do not function efficiently in promoting the acylation of furan, requiring an excessively long reaction period or, in some instances, failing entirely to catalyze the reaction. On the other hand, amounts of iodine exceeding about 3 per cent by weight of the reactants cause violent exothermic reactions which are extremely difficult to control. However, iodine present in amounts of about 0.1 per cent by weight of reactants has been found to give excellent results under the acylating conditions of the process of this invention.

While the present invention is not to be limited by any theory, the catalytic action of materials other than iodine disclosed herein as suitable acylation catalysts for furan is believed to be intimately connected with the fact that they yield iodine under the conditions of the acylation process. A very marked example of this effect is the catalytic action of hydriodic acid which tends to decompose, forming iodine during the acylation process. It is of interest to note that other hydro-halogen acids, such as hydrochloric, hydrobromic, or hydrofluoric acid, fail to exert any catalytic action in the acylation of furan. Likewise, iodic acid and iodic anhydride do not exhibit any tendency to promote the acylation reaction, although if a reducing agent is introduced into the reaction mixture causing the reduction of iodic acid to iodine, the acylation reaction takes place.

The following detailed examples are for the purpose of illustrating modes of effecting the acylation of furan in accordance with the process of this invention. It is to be clearly understood that the invention is not to be construed as limited to the specific acylating agents used or to the specific conditions set forth in the examples.

*Example 1*

To a well-stirred mixture of 34 grams (0.5 mole) of furan and 107 grams (1 mole) of 95 per cent acetic anhydride was added 1.0 gram of iodine. The mixture was then heated slowly to 35° C. over a period of 30 minutes and then heated rapidly to 60° C. in an additional 30 minutes. No reflux of furan was noted. The temperature of 60° C. was maintained for 30 minutes. The reaction mixture was then cooled to room temperature and 200 milliliters of water were added and the excess acetic anhydride decomposed. The organic layer was drained off and the water solution washed with chloroform. The chloroform wash was combined with the original organic layer and neutralized with sodium carbonate solution and then with sodium thiosulfate to remove traces of iodine. The resulting product, upon distillation, yielded 22.5 grams (40 per cent of theory) of 2-acetylfuran. The semicarbazone of this ketone had a melting point of 151–152° C.

*Example 2*

To a mixture of 2 moles of furan and 142 grams of benzoyl chloride was added 1.0 gram of iodine. The reaction mixture was refluxed gently at 40–50° C. for 5 hours. It was then cooled and poured into a solution of 20 per cent sodium hydroxide and stirred until all benzoyl chloride was neutralized. Upon distillation of this mixture, 21 grams of 2-benzoylfuran were obtained.

*Example 3*

To a mixture of 58 grams of furan and 107 grams of 95 per cent acetic anhydride were added 2.5 grams of 55 per cent hydriodic acid. The reaction rate was controlled by means of a dry ice bath and after gaining control of the reaction, the mixture was brought to room temperature. 200 milliliters of water were then added and the excess anhydride decomposed. The organic layer was drained off and the water solution washed three times with 50 milliliters of chloroform. The chloroform wash was combined with the original organic layer and neutralized with sodium carbonate solution and then with sodium thiosulfate to remove traces of iodine. The resulting product, upon distillation, yielded 70 grams (75.5 per cent of theory) of 2-acetylfuran. A few grams of residue remained from which crystalline 2,5-diacetylfuran could be detected.

*Example 4*

To 34 grams of furan were added 107 grams of 95 per cent acetic anhydride and 0.01 gram of iodine. After stirring the reaction mixture at room temperature for 1 hour, only a faintly positive ketone test with sodium nitroprusside could be obtained. The material was then refluxed for 3 hours, but the ketone test did not become stronger. The material was then cooled and 0.09 gram more of iodine were added. An immediate heat of reaction set in that was stopped at 60° C. by means of an ice bath. The reaction mixture was diluted with 200 milliliters of water upon bringing the temperature down to that of the room. The organic layer was drained off and the water solution washed with chloroform. The chloroform wash was combined with the original organic layer and neutralized with sodium carbonate solution and then with sodium thiosulphate to remove the last traces of iodine. The resulting product, upon distillation, yielded 33 grams (60 per cent of theory) of 2-acetylfuran.

*Example 5*

A mixture of 34 grams of furan and 107 grams of 95 per cent acetic anhydride was cooled in an ice bath to 0° C. and 4.00 grams of iodine were added to the cooled mixture. A heat of reaction was noted, which was dissipated by the ice bath in about 15 minutes. The mixture was then removed from the ice bath and allowed to warm up to room temperature. 200 milliliters of water were then added and the excess anhydride decomposed. The mixture was then worked up as in Example 3 and a yield of 22 grams (40 per cent of theory) of 2-acetylfuran was obtained.

From the above examples, it will be seen that small amounts of iodine are effective catalysts for the acylation of furan. Likewise, furan derivatives having one or more substituent groups attached to the furan ring may be acylated in accordance with this invention. The acylated furans as produced in accordance with the process described herein have found a variety of uses and may be employed as solvents, addition agents for petroleum fractions, plasticizers, resin intermediates, and intermediates for chemical synthesis. Long chain alkyl furyl ketones may be utilized as synthetic lubricants, dielectrics, waxes, and extreme pressure additives for mineral oils.

We claim:

1. A process for nuclear acylation of an acylatable furan, comprising reacting an acylatable furan with an acylating agent selected from the group consisting of acyl halides and anhydrides of carboxylic acids in the presence of an iodine catalyst.

2. A process for nuclear acylation of an acylatable furan, comprising reacting an acylatable furan with an acylating agent selected from the group consisting of acyl halides and anhydrides of carboxylic acids in the presence of an iodine catalyst and forming said catalyst in the reaction mixture by the generation therein of iodine during the course of the aforesaid acylation.

3. A process for nuclear acylation of an acylatable furan, comprising reacting an acylatable furan with an acylating agent selected from the group consisting of acyl halides and anhydrides of carboxylic acids in the presence of an iodine catalyst and forming said catalyst in the reaction mixture by the generation therein of iodine from hydriodic acid during the course of the aforesaid acylation.

4. A process for acylating furan, comprising reacting the same with an acylating agent selected from the group consisting of acyl halides and anhydrides of carboxylic acids in the presence of between about 0.03 per cent and about 3 per cent by weight of an iodine catalyst.

5. A process for acylating furan, comprising reacting the same with an acylating agent selected from the group consisting of acyl halides and anhydrides of carboxylic acids in the presence of an iodine catalyst and forming said catalyst in the reaction mixture by the generation therein of iodine during the course of the aforesaid acylation.

6. A process for acylating furan, comprising reacting the same with an acylating agent selected from the group consisting of acyl halides and anhydrides of carboxylic acids in the presence of an iodine catalyst and forming said catalyst in the reaction mixture by the generation therein of iodine from hydriodic acid during the course of the aforesaid acylation.

7. A process for acylating furan, comprising reacting the same with an acylating agent selected from the group consisting of acyl halides and anhydrides of carboxylic acids in the presence of between about 0.03 and about 3 per cent by weight of an iodine catalyst at a temperature between about −30° C. and about 150° C., forming said catalyst in the reaction mixture by the generation therein of iodine during the course of the aforesaid acylation, neutralizing the resultant product, removing iodine therefrom and distilling to obtain an acylated furan.

8. A process for acylating furan, comprising reacting the same with an acylating agent selected from the group, consisting of acyl halides and anhydrides of carboxylic acids in the presence of between about 0.03 and about 3 per cent by weight of an iodine catalyst at a temperature between about −30° C. and about 150° C., forming said catalyst in the reaction mixture by the generation therein of iodine from hydriodic acid during the course of the aforesaid acylation, neutralizing the resultant product, removing iodine therefrom and distilling to obtain an acylated furan.

9. A process for nuclear acylation of an acylatable furan, comprising reacting an acylatable furan with an acylating agent selected from the group consisting of acyl halides and anhydrides of carboxylic acids in the presence of between about 0.03 and about 3 per cent by weight of an iodine catalyst.

10. A process for nuclear acylation of an acylatable furan, comprising reacting an acylatable furan with an acylating agent selected from the group consisting of acyl halides and anhydrides of carboxylic acids in the presence of between about 0.03 and about 3 per cent by weight of an iodine catalyst and forming said catalyst in the reaction mixture by the generation therein of iodine during the course of the aforesaid acylation.

11. A process for nuclear acylation of an acylatable furan, comprising reacting an acylatable furan with an acylating agent selected from the group consisting of acyl halides and anhydrides of carboxylic acids in the presence of between about 0.03 and about 3 per cent by weight of an iodine catalyst and forming said catalyst in the reaction mixture by the generation therein of iodine from hydriodic acid during the course of the aforesaid acylation.

12. A process for acylation of furan, comprising reacting furan with an acylating agent selected from the group consisting of acyl halides and anhydrides of carboxylic acids in the presence of an iodine catalyst.

13. A process for acylation of furan, comprising reacting furan with an anhydride of a carboxylic acid in the presence of an iodine catalyst.

14. A process for nuclear acylation of an acylatable furan, comprising reacting an acylatable furan with an anhydride of a saturated fatty acid in the presence of an iodine catalyst.

15. A process for acylation of furan, comprising reacting furan with acetic anhydride in the presence of between about 0.03 and about 3 per cent by weight of an iodine catalyst.

16. A process for acylation of furan, comprising reacting furan with benzyl chloride in the presence of between about 0.03 and about 3 per cent by weight of an iodine catalyst.

17. A process for acylation of furan, comprising reacting furan with an acylating agent selected from the group consisting of acyl halides and anhydrides of carboxylic acids in the presence of between about 0.03 and about 3 per cent by weight of an iodine catalyst at a temperature between about −30° C. and about 150° C., neutralizing the resultant product, removing iodine therefrom and distilling to obtain an acylated furan.

HOWARD D. HARTOUGH.
ALVIN I. KOSAK.

REFERENCES CITED

The following references are of record in the file of this patent:

Gilman, "Organic Chemistry," ed. 2, vol. 1, pages 181 to 183; published by John Wiley, N. Y., 1943.

Chemical Reviews, vol. 17, 1935, pages 360, 361, 374 to 376.